Sept. 11, 1945.  N. E. HEWITT  2,384,742
MECHANISM FOR TRANSMITTING LINEAR OR ROTARY MOVEMENT
Filed Oct. 25, 1943  3 Sheets-Sheet 1
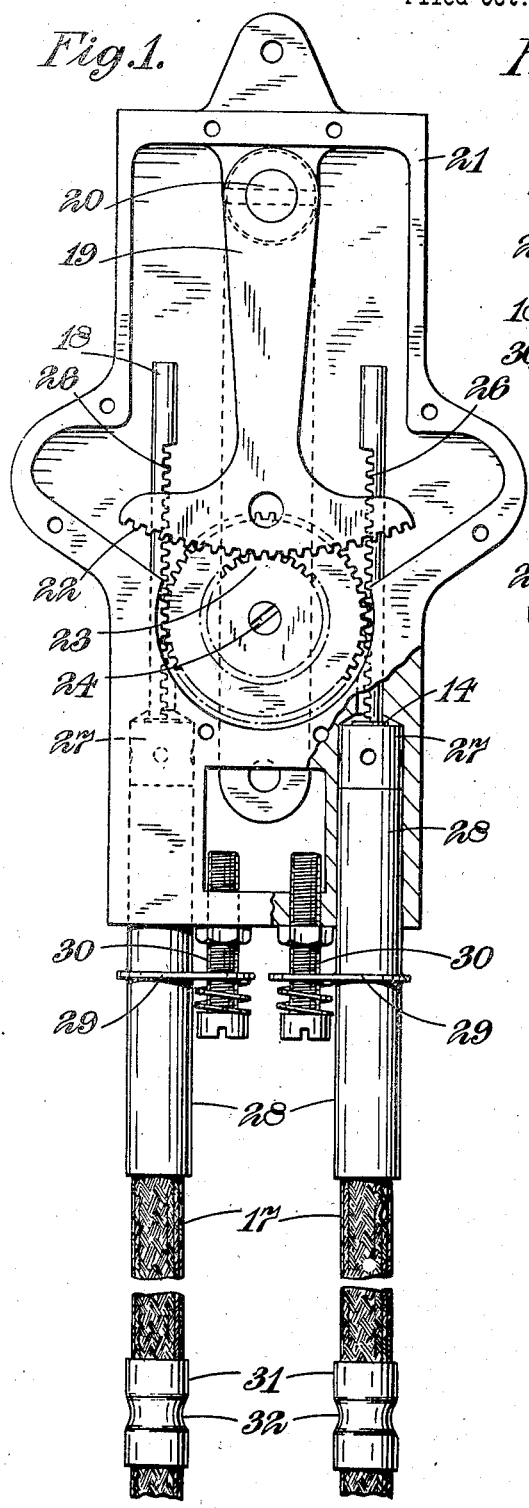
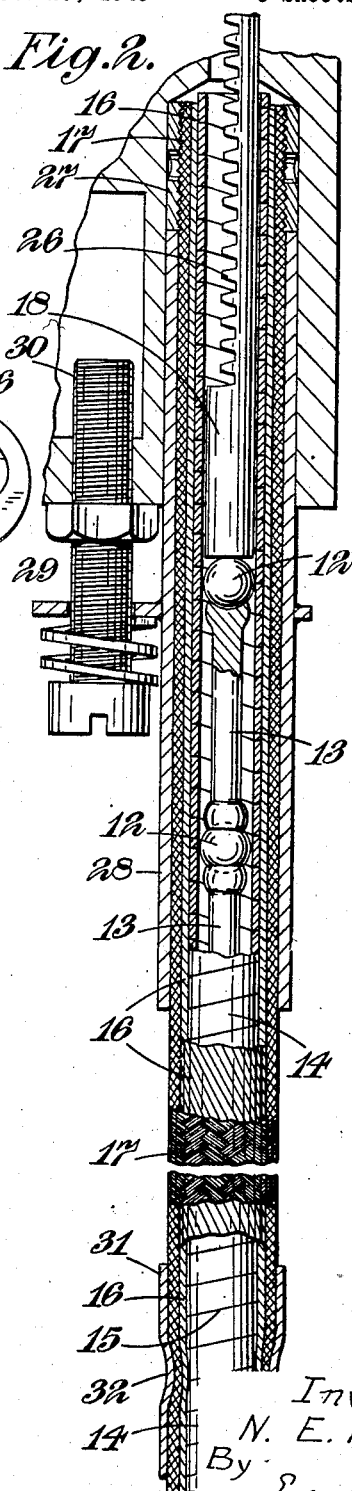
Inventor:
N. E. Hewitt
By
Young, Emery, Thompson
Attorneys

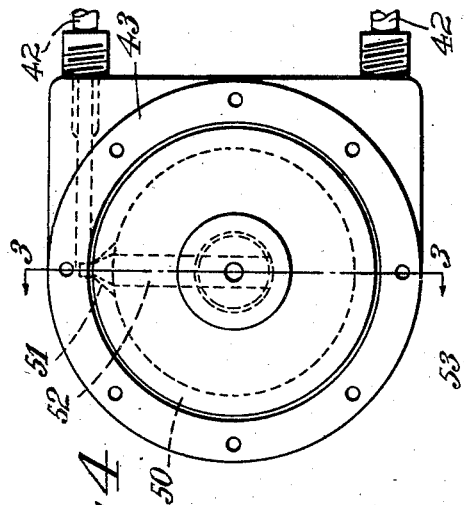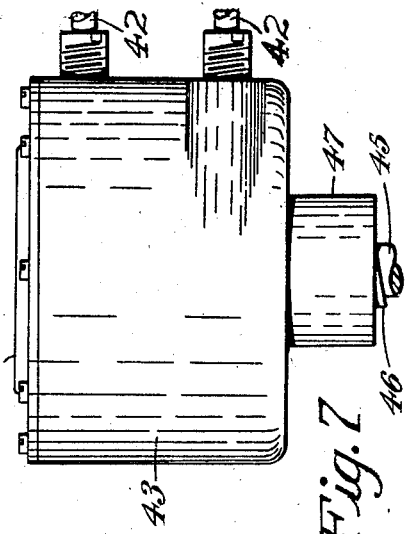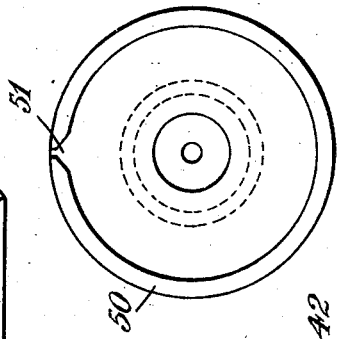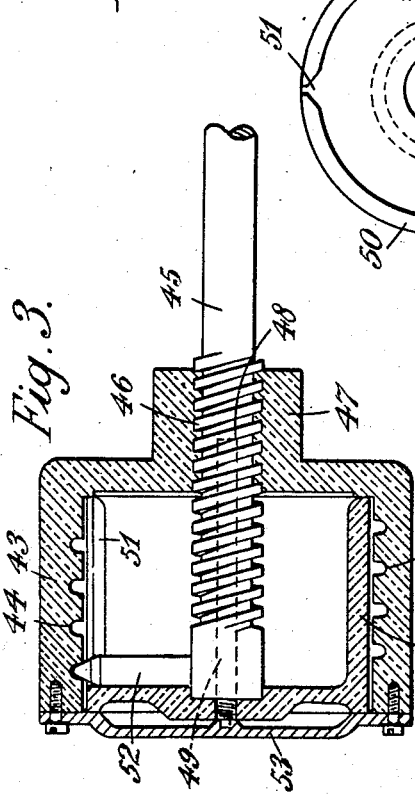

Sept. 11, 1945.    N. E. HEWITT    2,384,742
MECHANISM FOR TRANSMITTING LINEAR OR ROTARY MOVEMENT
Filed Oct. 25, 1943    3 Sheets-Sheet 3

Inventor:
N. E. Hewitt
By
Young, Emery & Thompson
Attorneys

Patented Sept. 11, 1945

2,384,742

UNITED STATES PATENT OFFICE 2,384,742

MECHANISM FOR TRANSMITTING LINEAR OR ROTARY MOVEMENT

Norman Ebenezer Hewitt, Sunbury-on-Thames, England

Application October 25, 1943, Serial No. 507,584
In Great Britain June 26, 1942

2 Claims. (Cl. 74—110)

This invention relates to mechanism for transmitting linear or rotary movement. There are various types of mechanisms in which a wire or the like can move within a sheath so as to enable linear movement to be transmitted even with curved paths but there are many instances (especially in the adjustment of instruments, sighting devices and the like) where such types of mechanisms give rise to difficulty particularly due to lost motion and to friction. The object of this invention is to provide mechanisms which minimise lost motion and friction.

It has previously been proposed to employ a mechanism comprising a tube within which is a series of alternating metal balls and distance pieces with concave ends, the diameter of the balls being greater than the diameter of the distance pieces so that it is the balls that contact with the inner surface of the tube: it has also been proposed to use springs to maintain the series of balls and distance pieces under compression.

This invention comprises a mechanism for transmitting linear movement in both directions in which there are two parallel flexible sheaths each provided internally with a series of alternating metal balls, and distance pieces with concave ends, and in which at each end of each sheath the series is operatively connected to a lever pivoted in a casing, the sheaths being fixed against axial movement in relation to said casings so that when angular movement is imparted to the lever at one end, corresponding angular movement is transmitted to the lever at the other end and the series of balls and distance pieces in each sheath is maintained in compression.

The balls are preferably steel balls such as are used in ball-bearings but may be of non-ferrous material. The distance pieces may be simple cylinders or prisms having concave ends of the same radius of curvature as the balls with which they are in close contact. Alternatively, the distance pieces may be bobbin-shaped with a central portion in the form of a cylinder or prism and end portions of greater diameter also in the form of cylinders or prisms, concave recesses being formed in the ends to engage the balls. The sheath preferably consists of a cylindrical metal tube which is flexible; this may be formed from braided metal wire or better still from helical metal tape, but other forms of flexible or rigid sheath may be employed, it being important that the inner surface is smooth so that the balls may move over said inner surface with the minimum of friction (the balls normally being free to rotate during movement round a bend). Alternatively the sheath may be a skeleton tube, and of round, square or any shaped section, so long as it achieves its purpose of constraining and guiding the inner member.

In mechanism for transmitting movement (particularly for the adjustment of instruments and the like) of the type referred to above it sometimes happens that the linear movement in the transmission can be considerably greater than the linear movement required for the actual adjustment: and indeed the linear movement in the transmission can be considerably greater than the linear movement effected by the operator. If the adjustment is effected by rotation of a spindle, sleeve or like operating member (or if the movement effected by the operator is a movement of rotation), it may be desirable that the angle of rotation is quite small or the rate of rotation is quite low while the linear movement in the transmission is comparatively great or rapid. Such an arrangement (involving a reducing gear) affords the advantage pointed out above that any lost motion in the coupling would be reduced in the adjustment. A further object of the present invention is to combine with a mechanism for transmitting linear motion of the type described above a reducing gear which imparts longitudinal and/or rotary movement to a spindle, sleeve or the like.

According to this invention the mechanism for transmitting linear movement comprises (as before) a sheath within which is a series of alternating metal balls and distance pieces with concave ends. There are two parallel sheaths but the series of alternating balls and distance pieces in the said sheaths are not separated from one another but form one continuous series which, within a relatively fixed casing passes around a helical channel. A shaft with its axis in the axis of the helix has screw engagement with the casing and carries a projecting arm engaging with said series (e. g. replacing one ball in the series) the arrangement being such that as the series of alternating balls and distance pieces moves in the helical channel the outer end of the arm is caused to follow in the helical path thus rotating the shaft which also moves axially, the pitch of the screw being the same as the pitch of the helix. Conveniently the casing contains a rotatable sleeve having a longitudinal slot to accommodate the outer end of the arm and to guide it. The sleeve may carry an axial spindle making a sliding fit within a long axial recess in the shaft so as to assist in supporting the shaft.

According to a further feature of this invention, the mechanism for transmitting linear or rotary movement comprises (as before) a sheath within which is a series of alternating balls and distance pieces with concave ends: there are two such sheaths and the series of alternating balls and distance pieces in the said sheaths are not separated from one another, but they pass into a substantially circular channel in a relatively fixed casing. A shaft with its axis normal to the plane of said channel has a radial arm which engages the series (e. g. which takes the place of one or more distance pieces), the arrangement being such that as the series of balls and distance pieces moves in either direction, the arm rotates the shaft in the casing. It is preferable to have such a casing at each end of the sheaths so as to form a transmission system.

In the accompanying drawings which illustrate various forms of the mechanism embodying this invention:

Figure 1 is an elevation partly in section and partly with a cover plate removed, showing one end of the mechanism and a portion of the sheath about the middle, and Figure 2 is a view mainly in section and on an enlarged scale.

Figures 3, 4, 5, 6 and 7 illustrate one form of reducing gear for use with the transmission of this invention.

Figure 3 is a central longitudinal section of the casing, the shaft being shown in full, Figure 4 is an end view of the casing, Figure 5 is an end view of the sleeve alone, Figure 6 is a side view, and

Figure 7 is a plan.

Figures 8 and 9 relate to an alternative form of this invention;

Figure 8 is a plan, partly in section, of the operating mechanism at the end of the transmission, and Figure 9 is a section on the line 9—9 of Figure 8.

Referring to Figures 1 and 2, metal balls 12 alternate with distance pieces 13 with concave ends within a flexible sheath which is of a composite character. The inner part of the sheath is a smooth tube of brass 14 with a helical cut 15 throughout its length so that this flexible metal tube is like a flat narrow metal tape which has been helically wound on a cylindrical core.

Immediately outside the helical flexible tube is a sheath 16 of braided wire and outside that again is a cover 17 of braided fabric. In the arrangement shown there are two parallel sheaths each provided internally with a series of alternating balls 12 and distance pieces 13.

At each end of each sheath is a sliding plunger 18 contacting with the last ball and these plungers are operatively connected with a rocking lever 19 on a spindle 20 pivoted in a casing 21. The arrangement is the same at each end of the mechanism.

In the form shown, rocking lever 19 (as above stated) has a spindle 20 pivoted in the casing 21 and the rocking lever has an arcuate rack 22 engaging a small toothed pinion 23 which is pivoted at 24 in the casing. The small pinion 23 is integral with or secured to a larger pinion 25 which engages at its opposite sides with racks 26 on the sliding plungers 18. The effect of this arrangement is that when angular movement is imparted to the lever 19 at one end the same angular movement is transmitted to the lever 19 at the other end and the series of balls and distance pieces in each sheath is maintained in compression.

The arrangement of the racks 22 and 26 and the pinions 23 and 25 constitutes a reducing gear so that any lost motion in the coupling would be reduced in the rotation of the spindle 20. The reduction can easily be 100:1 so that a lost motion of one thousandth of an inch in the coupling would be reduced to one hundred-thousandth of an inch at the instrument or sighting device which is being adjusted.

The method of fixing the sheaths 16 and 17 in this example is as follows:

At each end of the sheath where it embraces the sliding plunger 18 a short cylindrical metal collar 27 is firmly secured to the braided metal sheath 16 and the fabric sheath 17, and this collar is located in a cylindrical recess in the casing 21 and is firmly held in position by a long metal sleeve 28 having a flange 29 and adjustable fixing screws 30 which screw into the bottom of the casing 21.

About the middle of the sheath as a whole a short clamping sleeve 31 embraces the sheath and is inwardly depressed as at 32 to secure the outer sheaths 16 and 17 to the helical metal sheath 14. It will be seen that by the arrangement described, when the sheath as a whole is bent, the outer sheaths 16 and 17 cannot move longitudinally at all but the helical metal sheath 14 can move slightly from the fixed point 32 in relation to the outer sheaths 16 and 17.

In another arrangement the sliding plungers 18 are not toothed but are coupled to the ends of a length of chain which in turn engages with the teeth of a sprocket wheel which replaces the pinion 25.

In yet another arrangement, the inner member may be coupled at its end or at each end to a flexible cable which passes around one or more wheels or drums and is secured thereto so that motion is conveyed by or to such wheels or drums.

It is not necessary that the casing or sheath shall be a continuous tube: it may be slotted.

Referring to Figures 3 to 7, the sheaths 42 containing the series of balls and spacers are secured to a casing 43 having on its internal cylindrical surface a helical channel 44 and the series of balls and spacers passes around this channel. An axial shaft 45 carries a screw thread 46 (here shown as a 2-start thread), a boss 47 on the casing being internally threaded to correspond. The inner end of the shaft 45 has a long axial recess 48 having a sliding fit with an axial spindle 49 projecting from a rotatable sleeve 50 having a longitudinal slot 51 in its cylindrical wall. A radial arm 52 projects from the inner end of the shaft 45 and passes through the longitudinal slot 51 in the sleeve 50 which thus acts as a guide for the arm 52. The outer end of the arm 52 is suitably shaped to engage the series of balls and spacers. For example, it may replace one ball. The end of the casing 43 is closed by the cover 53. The effective pitch of the screw 46 is the same as the pitch of the helical channel 44 and as the series of balls and spacers is moved in the channel, the arm 52 is correspondingly moved and the shaft 45 is rotated and moved axially. The number of turns in the helical channel 14 may be selected to suit the extent of motion required.

The rotatable sleeve 50 lying immediately within the helical channel 44 serves to maintain the balls and spacers within the helical channel.

Referring to Figures 8 and 9, the two sheaths 61 each containing the series of balls 62 and spacers 63 are secured (at each end of the sheaths) to a boss or side arm 64 projecting radially from a circular casing 65. A channel 66 for balls and spacers is formed within the circular casing around the greater part of the circle (say 300°) and the two ends of that circular channel lead into two channels 67 in the boss or side arm 64 so that one continuous channel or path is provided for the balls and spacers.

In the centre of the circular casing 65 there is pivoted a radial member 68 which at its outer end engages the series of balls and spacers. For example, a projection 69 from the radial member may replace part of the series. Conveniently it may replace two spacers and one ball so that each end of this projection is in contact with a ball. To enable the compression in the series of balls and spacers to be maintained or adjusted, the radial arm 68 and the projection 69 therefrom may be split and a manually adjustable cam 70 may be used for varying the distance between the two parts. It will be understood that at one end of the transmission system movement may be imparted to a spindle, sleeve or the like secured to the pivot 71 of the radial arm and at the other end of the pivot of the radial arm may be connected to the instrument or device which is to be operated.

I claim:

1. A mechanism for transmitting linear movement in both directions having in combination two parallel flexible sheaths, a series of alternating metal balls and distance pieces with concave ends longitudinally slidably positioned in each sheath, two casings, one at each end of said sheaths, the sheaths, being fixed against axial movement in relation to said casings, a lever pivoted in each casing, and operative connections between each lever and the appropriate ends of the two series of metal balls and distance pieces, whereby the balls and distance pieces of both series are maintained in compression, the metal balls and distance pieces forming a continuous series and each casing having a helical channel around which the series passes, each casing having a lever secured to a shaft coaxial with the helix and having screw engagement with the casing.

2. A mechanism for transmitting linear movement in both directions having in combination two parallel flexible sheaths, a series of alternating metal balls and distance pieces with concave ends longitudinally slidably positioned in each sheath, two casings, one at each end of said sheaths, the sheaths being fixed against axial movement in relation to said casings, a lever pivoted in each casing, and operative connections between each lever and the appropriate ends of the two series of metal balls and distance pieces, whereby the balls and distance pieces of both series are maintained in compression, casings each provided with a substantially circular channel around which the series of balls and distance pieces passes, a shaft rotatably mounted in each casing normal to the plane of said channel and a radial lever secured to the shaft and engaging the series of balls and distance pieces.

NORMAN EBENEZER HEWITT.